(12) United States Patent
Harris et al.

(10) Patent No.: US 7,219,178 B2
(45) Date of Patent: May 15, 2007

(54) BUS DEADLOCK AVOIDANCE

(75) Inventors: Antony J Harris, Sheffield (GB);
Bruce J Mathewson, Cambs (GB);
Christopher E Wrigley, Saffron Walden (GB)

(73) Assignee: Arm Limited, Cambridge (GB)

( * ) Notice: Subject to any disclaimer, the term of this patent is extended or adjusted under 35 U.S.C. 154(b) by 98 days.

(21) Appl. No.: 10/953,500

(22) Filed: Sep. 30, 2004

(65) Prior Publication Data
US 2006/0075169 A1 Apr. 6, 2006

(51) Int. Cl.
*G06F 13/14* (2006.01)
*G06F 13/20* (2006.01)
*G06F 13/36* (2006.01)
*G06F 13/42* (2006.01)
*G06F 13/10* (2006.01)

(52) U.S. Cl. ............ 710/110; 710/305; 710/311; 710/316

(58) Field of Classification Search ............ None
See application file for complete search history.

(56) References Cited

U.S. PATENT DOCUMENTS

| | | | | |
|---|---|---|---|---|
| 4,494,193 A | * | 1/1985 | Brahm et al. | 709/225 |
| 5,469,435 A | * | 11/1995 | Krein et al. | 370/462 |
| 5,544,332 A | * | 8/1996 | Chen | 710/108 |
| 5,680,402 A | * | 10/1997 | Olnowich et al. | 370/498 |
| 5,682,485 A | * | 10/1997 | Farmer et al. | 710/316 |
| 5,761,454 A | * | 6/1998 | Adusumilli et al. | 710/311 |
| 5,933,612 A | * | 8/1999 | Kelly et al. | 710/311 |
| 5,949,981 A | * | 9/1999 | Childers | 710/310 |
| 6,292,910 B1 | * | 9/2001 | Cummins | 714/43 |
| 6,587,930 B1 | * | 7/2003 | Deshpande et al. | 711/144 |
| 6,665,818 B1 | * | 12/2003 | Dickey et al. | 714/32 |
| 2003/0120874 A1 | * | 6/2003 | Deshpande et al. | 711/141 |
| 2005/0223124 A1 | * | 10/2005 | Reed | 710/5 |
| 2006/0061689 A1 | * | 3/2006 | Chen et al. | 348/607 |

OTHER PUBLICATIONS

ARM Limited; "AMBA AXI Protocol"; Arm Limited; Version 1.0; Mar. 19, 2004.*

* cited by examiner

*Primary Examiner*—Paul R. Myers
*Assistant Examiner*—Ryan M Stiglic
(74) *Attorney, Agent, or Firm*—Nixon & Vanderhye P.C.

(57) ABSTRACT

Bus logic couples plural master logic units with plural slave logic units to enable data transfers. Each master unit performs an address transfer which, when received by a specified slave unit, causes a data transfer between that master unit and said specified slave unit. Each slave unit must complete a data transfer prior to performing any further data transfers. A slave unit performs data transfers in an order which differs from that in which associated address transfers were received by that slave unit. In response to an adress transfer, the bus logic couples a master unit with a slave unit to enable a data transfer. The bus logic determines whether propagation of an address transfer may cause a deadlock situation where data transfers can not take place between affected master and slave units and, if so, to prevent propagating that address transfer.

33 Claims, 4 Drawing Sheets

BUS DEADLOCK AVOIDANCE

BACKGROUND OF THE INVENTION

1. Field of the Invention

The present invention relates to techniques for avoiding bus deadlock and, in particular, to bus logic, an apparatus and a method for preventing bus deadlock situations occurring.

2. Description of the Prior Art

The problem of bus deadlock is known. A bus deadlock will typically occur when the configuration of the bus prevents logic units coupled thereto from performing or completing data transfers. When the deadlock occurs it is often very difficult to restore the bus to a normal operating state. Therefore, when deadlock occurs it is generally required that the configuration of the bus is reset, which will also typically impact on the configuration and operation of logic units coupled thereto. Hence, these logic units may also need to be reset to enable the required data transfers to be performed or completed. Accordingly, it will be appreciated that bus deadlock can have a devastating impact on the performance of a data processing apparatus.

Figure 1:
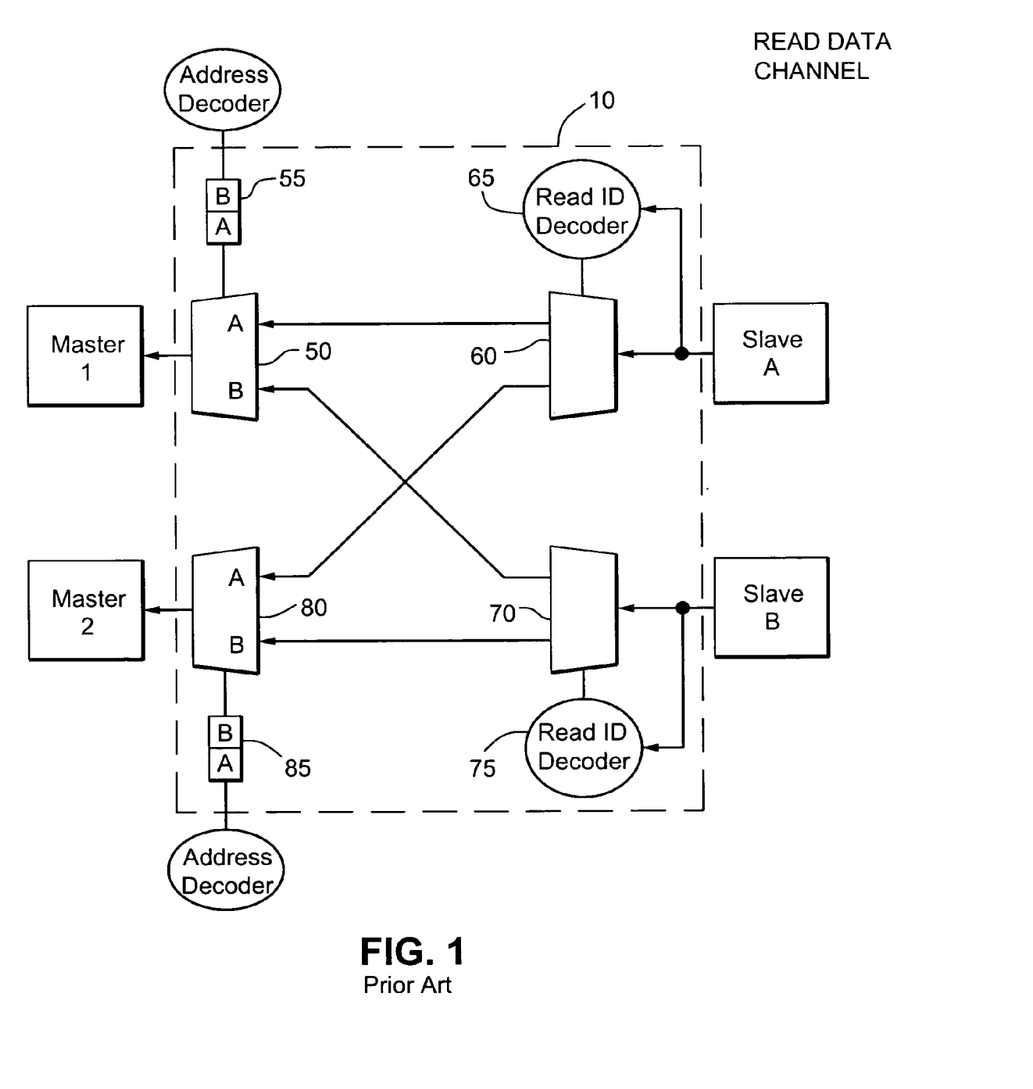
FIG. 1 illustrates a prior art data processing system having a bus which can be configured such that a deadlock situation can occur.

A known bus arrangement which can exhibit deadlock is shown in FIG. 1. In this arrangement there are two master logic units (master 1 and master 2) which can initiate data transfers with either of two slave logic units (slave A and slave B). Bus interconnect 10 comprises a number of multiplexers 50, 80 and demultiplexers 70, 60. The multiplexers 50, 80 are controlled by an associated FIFO 55, 85 which ensures that read data is returned to the master in the same order as the read addresses were issued. The demultiplexers 70, 60 are controlled by an associated decoder 65, 75 which selects the correct destination based on an identifier which accompanies the read data.

In many situations, this arrangement satisfactory enables data transfers to be performed between the masters and slaves, as required. However, a situation can occur when the bus interconnect 10 is configured such that a deadlock occurs. Such a deadlock manifests when no data transfers can occur because each data transfer is dependent on another, and none of those data transfers can complete.

To illustrate a simple deadlock consider the following sequence of data transfers: firstly, master 1 sends a read address to slave A, indicating that it requires read data; then master 1 sends a read address to slave B. The interconnect must ensure that the data is returned to the master in the correct order, from slave A then slave B. Before any data is transmitted, master 2 sends a read address to slave B, then one to slave A. Once again, the interconnect must ensure that the read data is returned in the address order, slave B then slave A. At this point, the interconnect has the state indicated in FIG. 1 with FIFOs 55 and 85 driving the read data multiplexors 50 and 80 to select the correct slave for that master.

Whilst it would be appreciated that in the normal course of events the bus interconnect 10 will enable the data transfers to occur in the required sequence, a problem exists in that it is often the case that at least one of the slaves is operable to reorder the sequence in which data is to be returned. This reordering of the returned data can occur for many different reasons. For example, if the slave is processing multiple data requests and an earlier data request is to a slow memory whilst a later request is to a faster memory, then it may be that the slave is able to provide the data for the later request prior to the early request. Such reordering of data can result in a deadlock occurring.

To illustrate how this can result in a deadlock, consider for example that slave A is able to reorder read data and provides the data requested by master 2 before the data requested by master 1. However, multiplexer 80 is currently configured to receive data from Slave B, which is trying to send data to Master 1, which in turn needs data from Slave A. Accordingly, none of the data transfers can occur and the bus interconnect 10 is said to be in a deadlock state. As mentioned above, one known technique to overcome this problem is to reset the configuration of the bus interconnect 10. However, it will be appreciated that even for this simple arrangement, resetting the bus interconnect 10 is a significant task since many data transfers may be queued and it may not be clear which event caused the deadlock to occur. Hence, such deadlock situations are normally resolved by way of a hard reset of the bus interconnect 10, and of the associated masters and slaves. It will appreciated that such resetting is undesirable since it can significantly impact on the performance of the overall system and may be potentially disastrous in any safety critical applications.

Accordingly, it is desired to provide an improved technique for performing data transfers over a bus which prevents bus deadlock situations occurring.

SUMMARY OF THE INVENTION

According to a first aspect of the present invention there is provided bus logic operable to couple a plurality of master logic units with a plurality of slave logic units to enable data transfers to occur, each master logic unit being operable to perform an address transfer which, when received by a specified one of the plurality of slave logic units, causes an associated data transfer to be performed between that master logic unit and the specified one of the plurality of slave logic units, each of the plurality of slave logic units being required to complete a data transfer, once initiated, prior to performing any further data transfers, at least one of the plurality of slave logic units being operable to perform data transfers in an order which differs from that in which associated address transfers were received by that slave logic unit, the bus logic comprising: interconnect logic configurable, responsive to an address transfer, to couple a master logic unit with a slave logic unit to enable a data transfer to take place; and deadlock prediction logic operable to receive information indicative of each address transfer and to determine whether propagation of that address transfer may cause the interconnect logic to be configured such that a deadlock situation can occur in which data transfers are unable to take place between affected master logic units and slave logic units and, if so, to prevent the propagation of that address transfer.

The deadlock prediction logic receives address transfers and examines each address transfer to determine whether that address transfer may cause the interconnect logic to be configured into a deadlock situation. If it is determined that the address transfer may result in a deadlock situation, then the deadlock prediction logic causes the propagation of that particular address transfer to the slave logic unit to be prevented. Accordingly, because the slave logic unit does not receive that address transfer the interconnect logic cannot be configured by that address transfer into an arrangement which may result in a deadlock situation occurring.

Hence, any address transfers which could result in the interconnect logic being configured such that a deadlock situation can occur are prevented from being provided. However, any address transfers which could not result in a deadlock situation occurring can be propagated. Accordingly, it will be appreciated that this arrangement enables the configuration of the interconnect logic to be carefully controlled such that it cannot be arranged to enable a deadlock situation to occur.

In one embodiment, the deadlock prediction logic is operable to receive information indicative of each address transfer from a master logic unit and to determine whether propagation of that address transfer may cause the interconnect logic to be configured such that a deadlock situation can occur in which no data transfers can take place and, if so, to prevent the propagation of that address transfer through the interconnect logic.

Accordingly, the deadlock prediction logic receives address transfers from a master logic unit and examines that address transfer to determine whether that address transfer may cause the interconnect logic to be configured in a deadlock situation. If it is determined that the address transfer may result in a deadlock situation, then the address transfer may be prevented from being propagated to the interconnect logic or prevented from being transferred through the interconnect logic to the slave logic unit. Accordingly, the interconnect logic or the slave logic unit does not receive the address transfer and so the interconnect logic cannot be configured by that address transfer such that a deadlock situation will result.

Hence, it will be appreciated that through this approach any address transfers which could result in the interconnect logic being configured such that a deadlock situation can occur are prevented from being propagated to the bus interconnect logic. However, any address transfers which do not result in a deadlock situation occurring can be propagated to the interconnect logic. Accordingly, it will be appreciated that this technique enables the configuration of the interconnect logic to be carefully controlled such that it cannot be configured to enable a deadlock situation to occur.

In one embodiment, the deadlock prediction logic is operable to determine that the deadlock situation can occur when an address transfer is requested by a master logic unit and that master logic unit is awaiting a data transfer associated with a previous address transfer.

Hence, the deadlock prediction logic prevents an address transfer from being propagated when that master logic unit is awaiting a data transfer from a previous address transfer. It will be appreciated that this ensures that any one master logic unit can only have an outstanding data transfer to a single slave logic unit. This ensures that deadlock cannot occur since there cannot be any dependencies for a given data transfer.

In one embodiment, the deadlock prediction logic is operable to determine that the deadlock situation can occur when a master logic unit requests an address transfer to a slave logic unit and that master logic unit is awaiting a data transfer associated with a previous address transfer from a different slave logic unit.

Similarly, by restricting each master logic unit to only have outstanding data transfers with the same slave logic unit ensures that no dependencies can occur for a given data transfer.

In one embodiment, one of the plurality of slave logic units is a priority slave logic unit and the deadlock prediction logic is operable to determine that the deadlock situation can occur when a master logic unit requests an address transfer to a slave logic unit which is not the priority slave logic unit and that master logic unit is awaiting a data transfer associated with a previous address transfer from a different slave logic unit.

Accordingly, the deadlock situation can also be avoided since a master logic unit is only permitted to perform further data transfers with a priority slave logic unit. Also, if high proportions of the data transfers over the bus are to the priority slave logic unit, then this arrangement provides for significantly improved performance.

In one embodiment, each of the plurality of slave logic units is assigned a priority and the deadlock prediction logic is operable to determine that the deadlock situation can occur when a master logic unit requests an address transfer to a slave logic unit and that master logic unit is awaiting a data transfer associated with a previous address transfer from a different slave logic unit which has a higher priority than the slave logic unit.

Accordingly, if each slave logic unit is allocated priority, then a master logic unit can be permitted to perform a data transfer with any slave logic unit having a higher priority than those associated with previous transfers. It will be appreciated that this allows many concurrent data transfers to occur and, if the slave logic unit priorities are based on slave speed and traffic received (i.e. fast and regularly accessed slave logic units are given a higher priority than others), the impact on data transfers caused by the operation of the deadlock prediction logic will be small.

In one embodiment, each of the plurality of slave logic units is assigned a unique priority.

In one embodiment, if the deadlock prediction logic determines that an address transfer requested by a master logic unit may cause the deadlock situation to occur, then the deadlock prediction logic is further operable to prevent the master logic unit from generating further address transfers until that address transfer has been propagated.

Preventing the master logic unit from generating further address transfers provides a convenient mechanism to stall a master logic unit until the potential for a deadlock situation occurring has passed. Thereafter, it will be appreciated that the master logic unit may be allowed to submit the address transfer which is outstanding once the possibility that the deadlock situation will occur has passed.

In one embodiment, the bus supports an AXI protocol and the deadlock prediction logic is operable to prevent the master logic unit from generating further address transfers by preventing a ready signal of an address channel from being asserted until that address transfer has been propagated by the deadlock prediction logic.

Utilising the ready signal of an address channel of an AXI protocol bus provides a convenient mechanism to signal the master logic unit that it should stop generating further address transfers until the existing address transfer has been propagated by the deadlock prediction logic.

In one embodiment, the deadlock prediction logic is operable to determine that the deadlock situation can occur when an address transfer is received from a master logic unit and it is determined that a cyclic dependency situation can arise by analysing all outstanding propagated address transfers.

It will be appreciated that this approach provides a robust technique to ensure that the deadlock prediction logic only prevents the propagation of address transfers when it is certain that a deadlock situation can occur. It will also be appreciated that this provides performance benefits over the earlier mentioned embodiments, however, this is at the cost of additional complexity in the deadlock prediction logic.

In one embodiment, the address transfer relates to data to be read from a slave logic unit and the data transfer relates to the data read from the slave logic unit.

In one embodiment, the address transfer relates to data to be written to a slave logic unit and the data transfer relates to an acknowledgement that the data has been written by the slave logic unit.

Accordingly, it will be appreciated that the address transfer can relate to either data to be read from a slave logic unit or data to be written to a slave logic unit and the data transfer can relate to either.

In one embodiment, the interconnect logic is configurable, responsive to each address transfer, to couple a master logic unit with a slave logic unit to enable a data transfer to take place, and the deadlock prediction logic operable to receive information indicative of an address transfer from the interconnect logic and to determine whether propagation of that address transfer to a specified slave logic unit may cause the interconnect logic to be configured such that a deadlock situation can occur in which no data transfers can take place and, if so, to prevent the propagation of that address transfer to the specified slave logic unit.

Hence, the deadlock prediction logic can prevent a deadlock situation occurring by preventing the propagation of an address transfer from the interconnect logic to a slave logic unit when the address transfer will result in a deadlock situation occurring. It will be appreciated that this provides a convenient technique to avoid such deadlock situations.

In one embodiment, the deadlock prediction logic is further operable to generate a manipulated address transfer and to propagate the manipulated address transfer to the specified slave logic unit having characteristics which prevent the deadlock situation from occurring.

It will be appreciated that the deadlock prediction logic prevents the propagation of an address transfer to a slave unit and instead generates a manipulated address transfer which is propagated to the slave logic unit. The manipulated address transfer characteristics have been altered by the deadlock prediction logic in order to prevent the deadlock situation from occurring.

In one embodiment, the manipulated address transfer indicates to the specified slave logic unit that data transfers are to be generated in an order which is identical to that in which each manipulated address transfer is received by that slave logic unit.

Accordingly, the manipulated address transfer causes the slave logic unit to be prevented from reordering data transfers from an order other than that in which the associated addresses were received. Since the slave logic unit can no longer reorder the data transfers the problem of a deadlock situation occurring is avoided.

In one embodiment, each address transfer includes an identification signal, the plurality of slave logic units are operable, for address transfers having the same identification signal, to generate data transfers in an order which is identical to that in which associated address transfers are received by that slave logic unit and the deadlock prediction logic is further operable to generate manipulated address transfers having the same identification signal to prevent the specified slave logic unit from performing data transfers in an order which differs from that in which associated manipulated address transfers are received.

Each slave logic unit is prevented from reordering data transfers which have the same identification signal. By applying the same identification signal to all data transfers, the slave logic units are thereby prevented from reordering any data transfers.

In one embodiment, the deadlock prediction logic maintains a record which associates each manipulated address transfer with an original identification signal and the deadlock prediction logic is operable to propagate the original identification signal when an associated data transfer is being performed.

By simply retaining a record associating each manipulated address transfer with its original identification signal, that original identification signal can readily be reinserted and propagated when the associated data transfer is being performed.

In one embodiment, the deadlock prediction logic is operable to determine that the deadlock situation can occur when a master logic unit requests an address transfer to a slave logic unit and that slave logic unit is awaiting a data transfer associated with a previous address transfer from a different master logic unit.

In one embodiment, the deadlock prediction logic is operable when it is determined that the deadlock situation can occur to prevent the interconnect logic from being configured to couple the master logic unit with the slave logic unit.

In one embodiment, the interconnect logic comprises arbiter logic associated with each slave logic unit and operable to couple that slave logic unit with a plurality of master logic units and the deadlock prediction logic is operable to prevent the interconnect logic from being configured to couple the master logic unit with the slave logic unit by signalling the arbiter logic to prevent the arbiter logic from coupling the master logic unit with the slave logic unit.

According to a second aspect of the present invention there is provided a data processing apparatus comprising: a plurality of master logic units, each master logic unit being operable to perform an address transfer; a plurality of slave logic units, a specified one of the plurality of slave logic units being operable in response to the address transfer to perform an associated data transfer between that master logic unit and said specified one of said plurality of slave logic units, each of said plurality of slave logic units being required to complete a data transfer, once initiated, prior to performing any further data transfers, at least one of the plurality of slave logic units being operable to perform data transfers in an order which differs from that in which associated address transfers were received by that slave logic unit; and bus logic operable to couple a plurality of master logic units with a plurality of slave logic units to enable data transfers to occur, the bus comprising: interconnect logic configurable, responsive to an address transfer, to couple a master logic unit with a slave logic unit to enable a data transfer to take place; and deadlock prediction logic operable to receive information indicative of each address transfer and to determine whether propagation of that address transfer may cause the interconnect logic to be configured such that a deadlock situation can occur in which data transfers are unable to take place between affected master logic units and slave logic units and, if so, to prevent the propagation of that address transfer.

According to a third aspect of the present invention there is provided in a bus operable to couple a plurality of master logic units with a plurality of slave logic units to enable data transfers to occur, each master logic unit being operable to perform an address transfer which, when received by a specified one of the plurality of slave logic units, causes an associated data transfer to be performed between that master logic unit and said specified one of said plurality of slave logic units, each of said plurality of slave logic units being required to complete a data transfer, once initiated, prior to performing any further data transfers, at least one of the plurality of slave logic units being operable to perform data transfers in an order which differs from that in which associated address transfers were received by that slave logic unit, a method of transferring data comprising the steps of: providing interconnect logic configurable, responsive to an address transfer, to couple a master logic unit with a slave logic unit to enable a data transfer to take place; and receiving information indicative of each address transfer and determining whether propagation of that address transfer may cause the interconnect logic to be configured such that a deadlock situation can occur in which data transfers are unable to can take place between affected master logic units and slave logic units and, if so, preventing the propagation of that address transfer.

According to a fourth aspect of the present invention there is provided bus logic operable to couple a plurality of master logic units with a plurality of slave logic units to enable data transfers to occur, each master logic unit being operable to perform an address transfer which, when received by a specified one of the plurality of slave logic units, causes an associated data transfer to be performed between that master logic unit and the specified one of the plurality of slave logic units, each of the plurality of slave logic units being required to complete a data transfer, once initiated, prior to performing any further data transfers, at least one of the plurality of slave logic units being operable to perform data transfers in an order which differs from that in which associated address transfers were received by that slave logic unit, the bus logic comprising: interconnect logic configurable, responsive to an address transfer, to couple a master logic unit with a slave logic unit to enable a data transfer to take place, and deadlock prediction logic operable to receive information indicative of each address transfer from the interconnect logic and to determine whether propagation of that address transfer to a specified slave logic unit may cause the interconnect logic to be configured such that a deadlock situation can occur in which no data transfers can take place and, if so, to prevent the propagation of that address transfer to the specified slave logic unit.

BRIEF DESCRIPTION OF THE DRAWINGS

The present invention will be described further, by way of example only, with reference to preferred embodiments thereof as illustrated in the accompanying drawings, in which.

DESCRIPTION OF THE EMBODIMENTS

Figure 2:
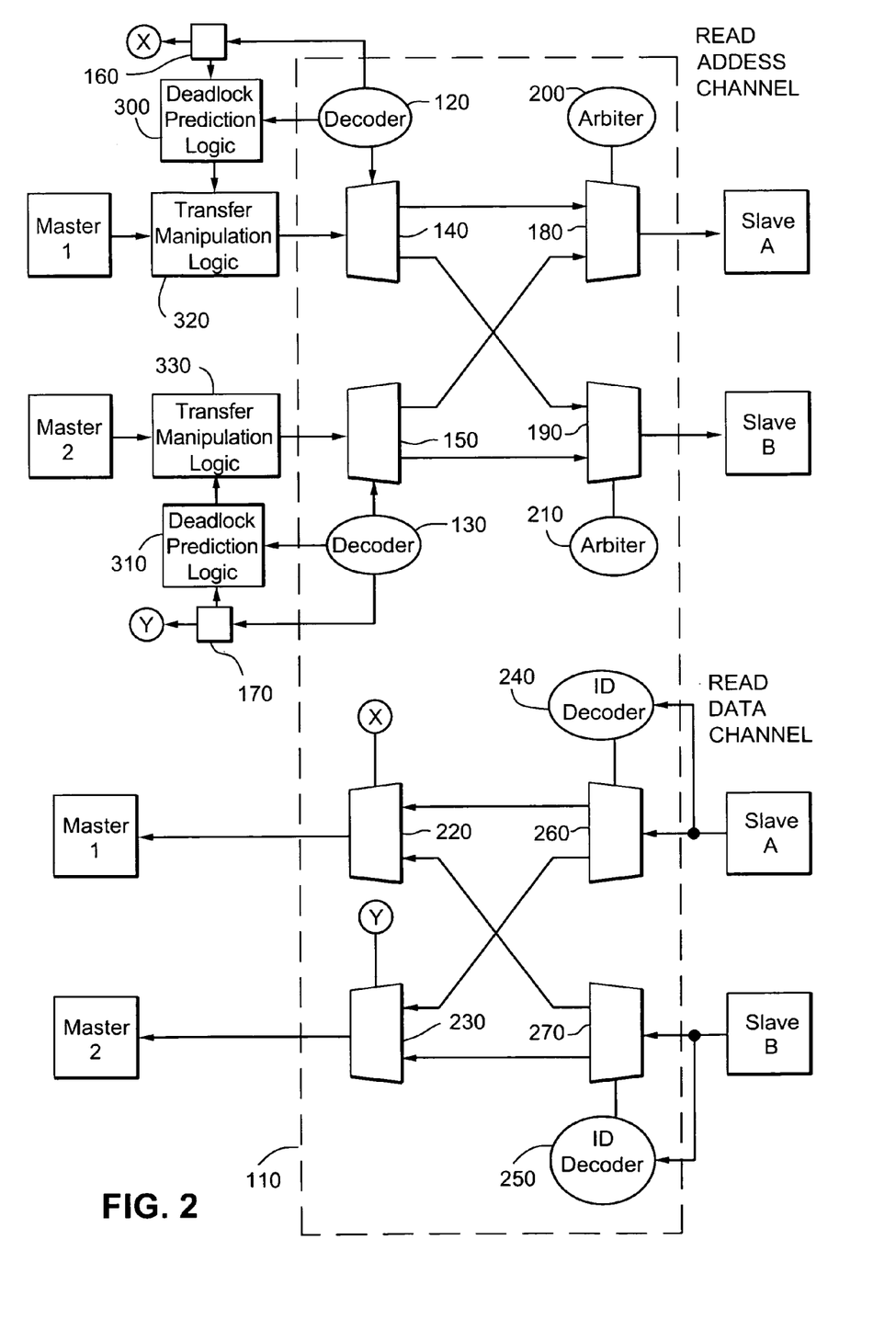
FIG. 2 illustrates a data processing system according to a first embodiment.

FIG. 2 illustrates a data processing system according to a first embodiment in which deadlock prediction logic 300; 310 are provided which signal respective transfer manipulation logic 320; 330 to prevent the transmission of address transfers to a bus interconnect 110 when it is determined that a deadlock situation could occur.

Each master logic unit and slave logic unit is arranged to communicate using an Advanced extensible Interface (AXI). The Advanced extensible interface provides a number of channels over which information and data can be provided. These channels comprise a read address channel, a write address channel, a write data channel, a read data channel, and a write response channel.

FIG. 2 illustrates elements of the data processing system associated with the read address channel (upper half of FIG. 2) and the read data channel (lower half of FIG. 2). The other channels have been omitted to improve clarity of the drawings. Each channel comprises a number of signal paths and buses. For example, the read address channel comprises an ARADDR bus which carries a value of the address to be read, and an ARID bus which carries an ID value indicating the identity of the source master logic unit. In addition, the read address channel comprises an ARVALID path over which a signal is asserted when the values on the ARADDR and ARID buses have been set by the source master logic unit and are ready to be read by a slave logic unit (otherwise the signal is de-asserted), and an ARREADY path over which a signal is asserted to signal to the source master logic unit when the values provided on the ARADDR and ARID buses have been received by the slave logic unit. A similar signalling technique is used on the other channels.

A decoder 120; 130 is associated with each multiplexer 140; 150. In response to an address transfer initiated by a master logic unit using the ARADDR and ARID buses, the respective decoder will review details of the address transfer and will pass details of the address transfer to an associated deadlock prediction logic 300; 310 to determine whether any conditions are met which may result in a deadlock situation occurring. If the deadlock prediction logic 300; 310 determines that a deadlock situation will occur then a signal is provided to the associated transfer manipulation logic 320; 330 which causes the transmission of that address transfer to the bus interconnect 110 to be prevented. Whilst the deadlock prediction logic 300; 310 has been illustrated as separate elements, it will be appreciated that a single element could be provided which received information relating to all transfers occurring over the bus interconnect 110.

The deadlock prediction logic 300; 310 provides the logic which implements the particular deadlock avoidance scheme. Such schemes include preventing transmission of the address transfer when: there is any outstanding address transfer associated with the originating master logic unit; a master logic unit has an outstanding address transfer associated with a different slave logic unit; a master logic unit has an outstanding address transfer associated with a slave logic unit and the current address transfer is associated with a different slave logic unit which is not a priority slave logic unit; and a master logic unit has an outstanding address transfer associated with a slave logic unit and the current address transfer is associated with a different slave logic unit which is not a higher priority slave logic unit. When implementing such schemes, priority tables are provided either within the deadlock prediction logic 300; 310 or which are accessible by the deadlock prediction logic 300; 310 to enable an assessment of the relative priority of different slave logic units to be determined. Also, the deadlock prediction logic 300; 310 will either maintain its own table of outstanding address transfers or will refer to the FIFOs 160; 170 (the contents of which are described in more detail below).

If any of the conditions are met then the deadlock prediction logic 300; 310 signal the transfer manipulation logic 320; 300 to stop the address transfer from taking place. The transfer manipulation logic 320; 300 will, on receipt of the signal from the deadlock prediction logic 300; 310, cause the signals provided over the ARREADY and ARVALID paths to be maintained in a de-asserted state which will prevent the associated master logic unit from issuing any further address transfers. Once the possibility of deadlock has passed the deadlock prediction logic 300; 310 will then signal the transfer manipulation logic 320; 300 to allow the signal provided over the ARREADY and ARVALID paths to be asserted and allow the address transfer to be completed.

If the address transfer is allowed to proceed, then the decoder associated with the originating master logic unit will determine based on the address value provided over the ARADDR bus which slave the address transfer is intended for. Typically, each decoder will maintain a table mapping address values with slave logic units. The decoder will then output a select signal to an associated master demultiplexer 140; 150 to select the output associated with the slave logic unit for which the address transfer is intended. The select signal from the decode logic in combination with the address transfer from the master logic unit is used to generate a slave number which is put into an associated first-in, first-out (FIFO) buffer 160; 170. As will be described in more detail below, the contents of each FIFO buffer are then used by the associated read channel to determine which slave logic unit should be monitored for returned read data.

Meanwhile, an arbiter 200; 210 will receive a signal indicating that one or more of the master logic units wishes to perform an address transfer. The arbiter will, in accordance with well-known arbitration schemes, select the appropriate master logic unit will provide a signal to the associated slave multiplexer 180; 190 to switch to the input associated with that master logic unit.

Accordingly, the address transfer can proceed from the master logic unit to the slave logic unit. Once a path has been set up across the bus interconnect 110, the destination slave logic unit will receive the signal asserted over the ARVALID path indicating that the address value provided on a address bus along with an ID value (which is associated with the originating master logic unit) should be sampled. Once the slave logic unit has captured these values, then a signal is propagated back to the master logic unit over the ARREADY path to indicate that the address transfer has completed.

The read data channel is now configured to receive read data associated with the address transfer mentioned above. Once the slave logic unit has performed the read from the address value specified by the address transfer and has the required read data to return, it then outputs this read data along with an ID value to an ID decoder 240; 250. The ID decoder determines from the ID value which master logic unit that read data transfer is intended for by referring typically to a look-up table which associates ID values with master logic units. The ID decoder will output a select signal to its associated demultiplexer 260; 270 which in turn selects the output associated with the destination master logic unit.

Conveniently, a master multiplexer associated 220; 230 with the destination master logic unit is already configured to select the appropriate input since the master multiplexer receives a select signal from the associated FIFO 160; 170 in the read address channel indicating which slave logic unit it should be monitoring for the returned read data.

In a similar manner to the signalling described in relation to the read address channel, the read data channel uses comparable signalling between the slave logic unit and the master logic unit. Now that a path has been set up across the bus interconnect 110, the master logic unit will receive a signal asserted over the RVALID path indicating that the read data value provided on a read data bus should be sampled. Once the master logic unit has captured this value, then a signal is propagated back to the slave logic unit over the RREADY path to indicate that the read data transfer has completed.

As mentioned above, because only those data transfers which will not result in a deadlock situation occurring are transferred to the slave logic units, no intervention in the configuration of the bus interconnect 110 is required since it is certain that no deadlock situations can occur.

Figure 3:
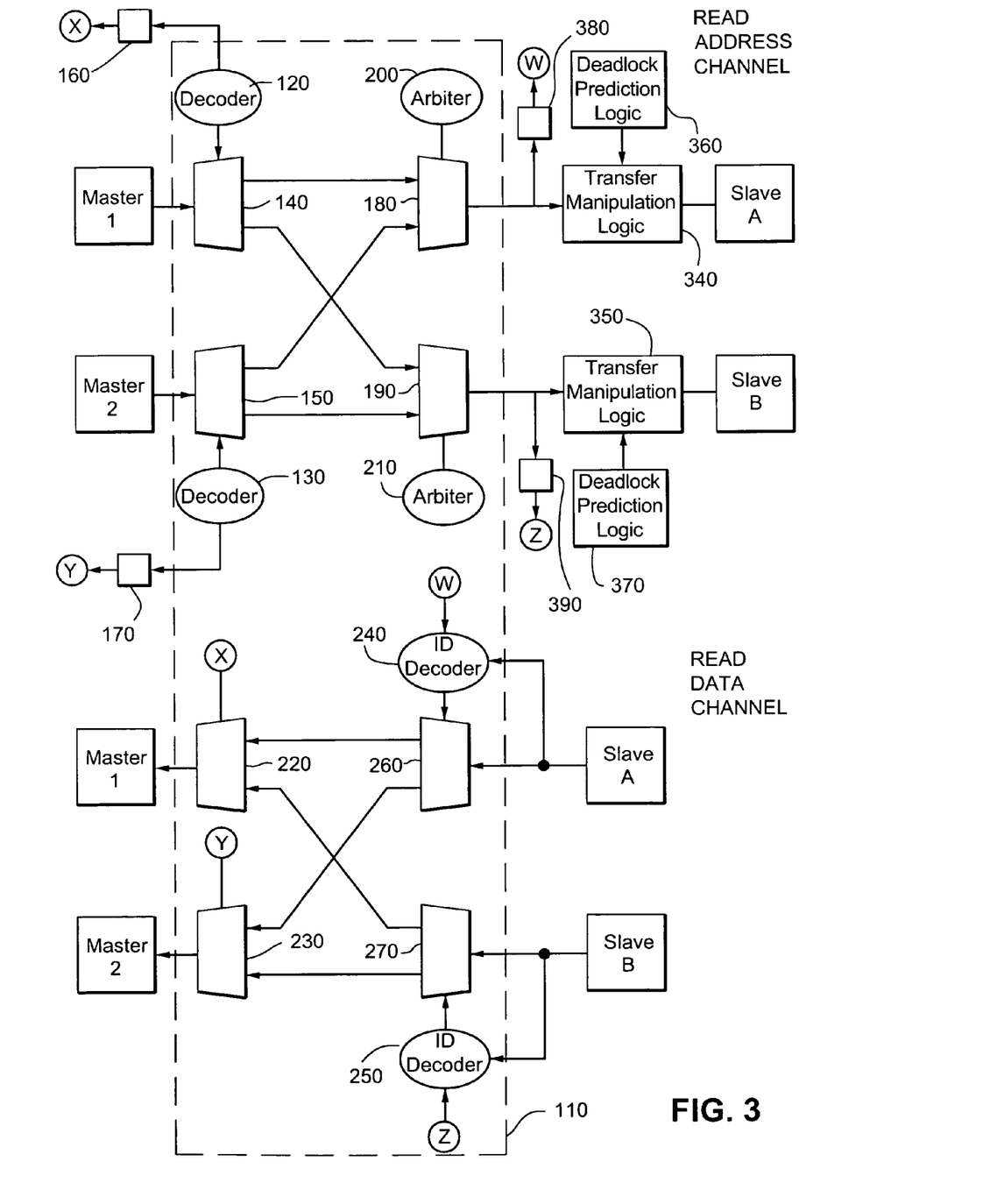
FIG. 3 illustrates a data processing system according to a second embodiment.

FIG. 3 illustrates a data processing system according to a second embodiment in which transfer manipulation logic 340; 350 is provided which prevents the transmission of address transfers from the bus interconnect 110 to slave logic units in the form provided by master logic units. Instead, a manipulated address transfer is propagated from the transfer manipulation logic 340; 350 which, as will be discussed in more detail below, ensures that a deadlock situation can not occur.

The initial stages of any address transfer and the configuration of the bus interconnect 110 may be the same as that described with respect to FIG. 2 for transfers which are allowed to proceed. However, transfer manipulation logic 340; 350 is provided between the bus interconnect 110 and a respective slave logic unit. The transfer manipulation logic 340; 350 is arranged to manipulate signals provided by the bus interconnect 110 and to transmit a manipulated address transfer to its associated slave.

Each slave logic unit is arranged such that it cannot reorder data transfers having the same ID value. That is, logic within slave logic units prevents the slave logic unit from reordering data transfers associated with address transfers sharing the same ID value. Accordingly, the deadlock prediction logic 340; 350 determines whether the ID value received differs from a single predetermined ID value and, if so, controls the transfer manipulation logic 340; 350 to substitute the ID value provided over the ARID bus with the single predetermined ID value. The deadlock prediction logic 340; 350 maintains an associated look-up table 380; 390 which records the ID value provided over the ARID bus. Hence, the slave logic unit will receive address transfers having the same ID value and will be prevented from reordering the associated read data transfers, thereby preventing a deadlock situation occurring.

Once the slave logic unit has performed the read from the address value specified by the address transfer and has the required read data to return, it then outputs this read data along with an ID value. The ID value is provided to the associated look-up table 380; 390 which in turn outputs the originating ID value to an ID decoder 240; 250. It will be appreciated that because reordering of read data transfers is prevented, the oldest entry in the associated look-up table will indicate the originating ID value. The ID decoder determines from the ID value which master logic unit that read data transfer is intended for by referring typically to a further look-up table which associates ID values with master logic units. The ID decoder will output a select signal to its associated demultiplexer 260; 270 which in turn selects the output associated with the source master logic unit. The remainder of the read data transfer may be conducted in a similar manner to that described with reference to FIG. 2.

Hence, the transfer manipulation logic 340; 350 can prevent a deadlock situation occurring by preventing the propagation of an address transfer to a slave logic unit in the form provided by a master logic unit. It will be appreciated that this provides a convenient technique to avoid such deadlock situations.

Figure 4:
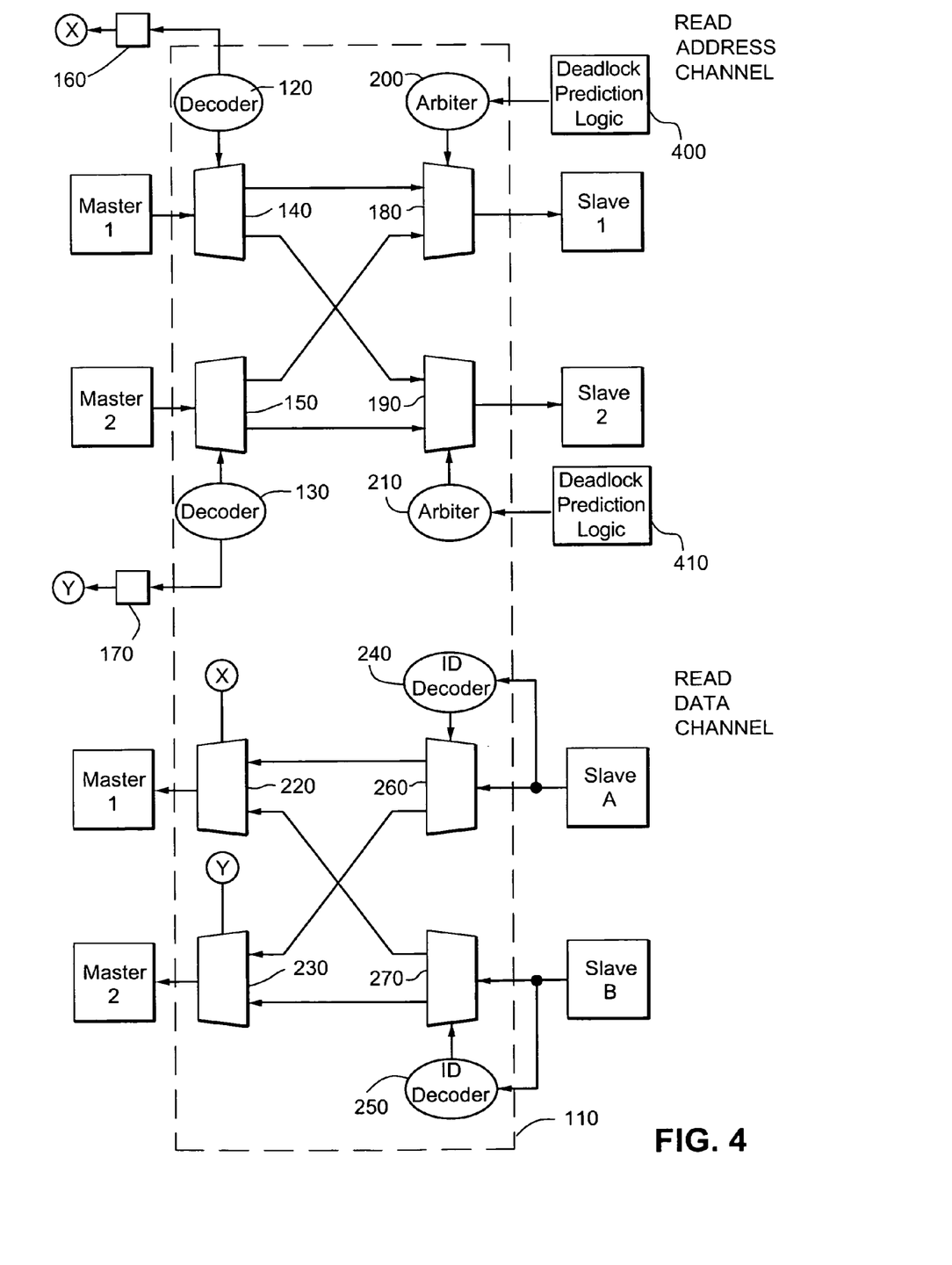
FIG. 4 illustrates a data processing system according to a third embodiment.

FIG. 4 illustrates a data processing system according to a third embodiment in which deadlock prediction logic 400;

410 is provided which prevents the transmission of address transfers from the bus interconnect 110 to slave logic units by providing signals to an associated arbiter 200; 210 when it is determined that a deadlock situation could occur.

The initial stages of any address transfer and the configuration of the bus interconnect 110 may be the same as that described with respect to FIG. 2 for transfers which are allowed to proceed.

Deadlock prediction logic 400; 410 is provided which receives details of address transfers and determines whether a condition is met which may result in a deadlock situation occurring. If the deadlock prediction logic 400; 410 determines that a deadlock situation will occur then a signal is provided to the associated arbiter 200; 210 which causes the transmission of that address transfer from the bus interconnect 110 to be prevented by preventing the arbiter 200; 210 from selecting the master logic unit associated with the address transfer which may cause the deadlock situation to occur. Whilst the deadlock prediction logic 400; 410 has been illustrated as separate elements, it will be appreciated that a single element could be provided which received information relating to all transfers occurring over the bus interconnect 110.

The deadlock prediction logic 400; 410 provides the logic which implements the deadlock avoidance scheme. Hence, logic is provided which determines whether or not the destination slave logic unit which is the subject of an address transfer is currently servicing an address transfer associated with a different master logic unit. This determination is made with reference to a look-up table or a register provided by the deadlock prediction logic which stores the master number of the master logic unit for which that slave logic unit has outstanding data transfers. If it is determined that the slave logic unit is currently servicing a transfer associated with a different master logic unit then a deadlock situation could occur and a signal is provided to the associated arbiter to prevent signals being provided to cause the associated multiplexer 60 to select the master logic unit. Because the arbiter prevents the master logic unit from being selected, the signals provided over the ARREADY and ARVALID paths remain in a de-asserted state which prevents the master logic unit from issuing any further address transfers. Once the possibility of deadlock has passed the deadlock prediction logic 400; 410 will then signal the arbiter to allow selection of the master logic unit which, in turn, enables the signals provided over the ARREADY and ARVALID paths to be asserted when the address transfer has completed. The remainder of the read data transfer may be conducted in a similar manner to that described with reference to FIG. 2.

Hence, the deadlock prediction logic 400; 410 can prevent a deadlock situation occurring by preventing the propagation of an address transfer to a slave logic unit by controlling the arbiter to prevent that address transfer from completing. It will be appreciated that this provides a convenient technique to avoid such deadlock situations.

Whilst the above embodiments have been described with respect to a read operation from a slave logic unit using the read data channel, it will be appreciated that a similar approach is adopted for write operations where the slave logic unit is driving the write response channel.

Although illustrative embodiments of the invention have been described herein with reference to the accompanying drawings, it is to be understood that the invention is not limited to those precise embodiments, and that various changes and modifications can be affected therein by one skilled in the art without departing from the scope and spirit of the invention as defined by the appended claims.

We claim:

1. Bus logic operable to couple a plurality of master logic units with a plurality of slave logic units to enable data transfers to occur, each master logic unit being operable to perform an address transfer over an address channel which, when received by a specified one of said plurality of slave logic units, causes an associated data transfer to be performed over a data channel between that master logic unit and said specified one of said plurality of slave logic units, each of said plurality of slave logic units being required to complete a data transfer, once initiated, prior to performing any further data transfers, at least one of said plurality of slave logic units being operable to perform data transfers in an order which differs from that in which associated address transfers were received by that slave logic unit, said bus logic comprising:
   interconnect logic configurable, responsive to an address transfer, to couple a master logic unit with a slave logic unit to enable a data transfer to take place; and
   deadlock prediction logic operable to receive information indicative of each address transfer and to determine, based on an ability of said at least one of said plurality of slave logic units to perform data transfers in an order which differs for associated address transfers, whether propagation of that address transfer may cause said interconnect logic to be configured such that a deadlock situation can occur in which data transfers are unable to take place between affected master logic units and slave logic units and, if so, to prevent the propagation of that address transfer.

2. The bus logic of claim 1, wherein said deadlock prediction logic is operable to receive information indicative of each address transfer from a master logic unit and to determine whether propagation of that address transfer may cause said interconnect logic to be configured such that a deadlock situation can occur in which no data transfers can take place and, if so, to prevent the propagation of that address transfer through said bus interconnect logic.

3. The bus logic of claim 2, wherein said deadlock prediction logic is operable to determine that said deadlock situation can occur when an address transfer is requested by a master logic unit and that master logic unit is awaiting a data transfer associated with a previous address transfer.

4. The bus logic of claim 2, wherein said deadlock prediction logic is operable to determine that said deadlock situation can occur when a master logic unit requests an address transfer to a slave logic unit and that master logic unit is awaiting a data transfer associated with a previous address transfer from a different slave logic unit.

5. The bus logic of claim 2, wherein one of said plurality of slave logic units is a priority slave logic unit and said deadlock prediction logic is operable to determine that said deadlock situation can occur when a master logic unit requests an address transfer to a slave logic unit which is not said priority slave logic unit and that master logic unit is awaiting a data transfer associated with a previous address transfer from a different slave logic unit.

6. The bus logic of claim 2, wherein each of said plurality of slave logic units is assigned a priority and said deadlock prediction logic is operable to determine that said deadlock situation can occur when a master logic unit requests an address transfer to a slave logic unit and that master logic unit is awaiting a data transfer associated with a previous address transfer from a different slave logic unit which has a higher priority than said slave logic unit.

7. The bus logic of claim 6, wherein each of said plurality of slave logic units is assigned a unique priority.

8. The bus logic of claim 2, wherein if said deadlock prediction logic determines that an address transfer requested by a master logic unit may cause said deadlock situation to occur, then said deadlock prediction logic is further operable to prevent said master logic unit from generating further address transfers until that address transfer has been propagated.

9. The bus logic of claim 7, wherein said bus supports an AXI protocol and said deadlock prediction logic is operable to prevent said master logic unit from generating further address transfers by preventing a ready signal of said address channel from being asserted until that address transfer has been propagated by said deadlock prediction logic.

10. The bus logic of claim 2, wherein said deadlock prediction logic is operable to determine that said deadlock situation can occur when an address transfer is received from a master logic unit and it is determined that a cyclic dependency situation can arise by analysing all outstanding propagated address transfers.

11. The bus logic of claim 2, wherein the address transfer relates to data to be read from a slave logic unit and said data transfer relates to said data read from said slave logic unit.

12. The bus logic of claim 2, wherein the address transfer relates to data to be written to a slave logic unit and said data transfer relates to an acknowledgement that said data has been written by said slave logic unit.

13. The bus logic of claim 1, wherein said interconnect logic is configurable, responsive to each address transfer, to couple a master logic unit with a slave logic unit to enable a data transfer to take place, and said deadlock prediction logic operable to receive information indicative of an address transfer from said interconnect logic and to determine whether propagation of that address transfer to a specified slave logic unit may cause said interconnect logic to be configured such that a deadlock situation can occur in which no data transfers can take place and, if so, to prevent the propagation of that address transfer to said specified slave logic unit.

14. The bus logic of claim 13, wherein said deadlock prediction logic is further operable to generate a manipulated address transfer and to propagate said manipulated address transfer to said specified slave logic unit having characteristics which prevent said deadlock situation from occurring.

15. The bus logic of claim 14, wherein said manipulated address transfer indicates to said specified slave logic unit that data transfers are to be generated in an order which is identical to that in which each manipulated address transfer is received by that slave logic unit.

16. The bus logic of claim 15, wherein each address transfer includes an identification signal, said plurality of slave logic units are operable, for address transfers having the same identification signal, to generate data transfers in an order which is identical to that in which associated address transfers are received by that slave logic unit and said deadlock prediction logic is further operable to generate manipulated address transfers having the same identification signal to prevent said specified slave logic unit from performing data transfers in an order which differs from that in which associated manipulated address transfers are received.

17. The bus logic of claim 16, wherein said deadlock prediction logic maintains a record which associates each manipulated address transfer with an original identification signal and said deadlock prediction logic is operable to propagate said original identification signal when an associated data transfer is being performed.

18. The bus logic of claim 13, wherein said deadlock prediction logic is operable to determine that said deadlock situation can occur when a master logic unit requests an address transfer to a slave logic unit and that slave logic unit is awaiting a data transfer associated with a previous address transfer from a different master logic unit.

19. The bus logic of claim 18, wherein said deadlock prediction logic is operable when it is determined that said deadlock situation can occur to prevent said interconnect logic from being configured to couple said master logic unit with said slave logic unit.

20. The bus logic of claim 19, wherein said interconnect logic comprises arbiter logic associated with each slave logic unit and operable to couple that slave logic unit with a plurality of master logic units and said deadlock prediction logic is operable to prevent said interconnect logic from being configured to couple said master logic unit with said slave logic unit by signalling said arbiter logic to prevent said arbiter logic from coupling said master logic unit with said slave logic unit.

21. A data processing apparatus comprising:
a plurality of master logic units, each master logic unit being operable to perform an address transfer over an address channel;
a plurality of slave logic units, a specified one of said plurality of slave logic units being operable in response to said address transfer to perform an associated data transfer over a data channel between that master logic unit and said specified one of said plurality of slave logic units, each of said plurality of slave logic units being required to complete a data transfer, once initiated, prior to performing any further data transfers, at least one of said plurality of slave logic units being operable to perform data transfers in an order which differs from that in which associated address transfers were received by that slave logic unit; and
bus logic operable to couple a plurality of master logic units with a plurality of slave logic units to enable data transfers to occur, said bus comprising:
  interconnect logic configurable, responsive to an address transfer, to couple a master logic unit with a slave logic unit to enable a data transfer to take place; and
  deadlock prediction logic operable to receive information indicative of each address transfer and to determine, based on an ability of said at least one of said plurality of slave logic units to perform data transfers in an order which differs for associated address transfers, whether propagation of that address transfer may cause said interconnect logic to be configured such that a deadlock situation can occur in which data transfers are unable to take place between affected master logic units and slave logic units and, if so, to prevent the propagation of that address transfer.

22. In bus logic operable to couple a plurality of master logic units with a plurality of slave logic units to enable data transfers to occur, each master logic unit being operable to perform an address transfer over an address channel which, when received by a specified one of said plurality of slave logic units, causes an associated data transfer over a data channel to be performed between that master logic unit and said specified one of said plurality of slave logic units, each of said plurality of slave logic units being required to complete a data transfer, once initiated, prior to performing any further data transfers, at least one of said plurality of slave logic units being operable to perform data transfers in an order which differs from that in which associated address transfers were received by that slave logic unit, a method of transferring data comprising the steps of:

providing interconnect logic configurable, responsive to an address transfer, to couple a master logic unit with a slave logic unit to enable a data transfer to take place; and receiving information indicative of each address transfer and determining, based on an ability of said at least one of said plurality of slave logic units to perform data transfers in an order which differs for associated address transfers, whether propagation of that address transfer may cause said interconnect logic to be configured such that a deadlock situation can occur in which data transfers are unable to take place between affected master logic units and slave logic units and, if so, preventing the propagation of that address transfer.

23. The method of claim 22, wherein deadlock prediction logic receives information indicative of each address transfer from a master logic unit and determines whether propagation of that address transfer may cause said interconnect logic to be configured such that a deadlock situation can occur in which no data transfers can take place and, if so, prevents the propagation of that address transfer through said bus interconnect logic.

24. The method of claim 23, wherein one of said plurality of slave logic units is a priority slave logic unit and said deadlock prediction logic determines that said deadlock situation can occur when a master logic unit requests an address transfer to a slave logic unit which is not said priority slave logic unit and that master logic unit is awaiting a data transfer associated with a previous address transfer from a different slave logic unit.

25. The method of claim 23, wherein each of said plurality of slave logic units is assigned a priority and said deadlock prediction logic determines that said deadlock situation can occur when a master logic unit requests an address transfer to a slave logic unit and that master logic unit is awaiting a data transfer associated with a previous address transfer from a different slave logic unit which has a higher priority than said slave logic unit.

26. The method of claim 25, wherein each of said plurality of slave logic units is assigned a unique priority.

27. The method of claim 23, wherein if said deadlock prediction logic determines that an address transfer requested by a master logic unit may cause said deadlock situation to occur, then said deadlock prediction logic further prevents said master logic unit from generating further address transfers until that address transfer has been propagated.

28. The method of claim 27, wherein said bus supports an AXI protocol and said deadlock prediction logic prevents said master logic unit from generating further address transfers by preventing a ready signal of said address channel from being asserted until that address transfer has been propagated by said deadlock prediction logic.

29. The method of claim 22, wherein said interconnect logic, responsive to each address transfer, couples a master logic unit with a slave logic unit to enable a data transfer to take place, and said deadlock prediction logic receives information indicative of an address transfer from said interconnect logic and determines whether propagation of that address transfer to a specified slave logic unit may cause said interconnect logic to be configured such that a deadlock situation can occur in which no data transfers can take place and, if so, prevents the propagation of that address transfer to said specified slave logic unit.

30. The method of claim 29, wherein said deadlock prediction logic generates a manipulated address transfer and propagates said manipulated address transfer to said specified slave logic unit having characteristics which prevent said deadlock situation from occurring.

31. The method of claim 30, wherein said manipulated address transfer indicates to said specified slave logic unit that data transfers are to be generated in an order which is identical to that in which each manipulated address transfer is received by that slave logic unit.

32. The method of claim 31, wherein each address transfer includes an identification signal, and wherein said plurality of slave logic units, for address transfers having the same identification signal, generate data transfers in an order which is identical to that in which associated address transfers are received by that slave logic unit, and wherein said deadlock prediction logic generates manipulated address transfers having the same identification signal to prevent said specified slave logic unit from performing data transfers in an order which differs from that in which associated manipulated address transfers are received.

33. The method of claim 32, wherein said deadlock prediction logic maintains a record which associates each manipulated address transfer with an original identification signal and said deadlock prediction logic propagates said original identification signal when an associated data transfer is being performed.

* * * * *